C. G. TENGDIN.
SPUD WRENCH.
APPLICATION FILED JULY 12, 1920.

1,369,143.

Patented Feb. 22, 1921.

Inventor.
Charles G. Tengdin
by Heard Smith & Tennant
Attys.

UNITED STATES PATENT OFFICE.

CHARLES G. TENGDIN, OF KANKAKEE, ILLINOIS, ASSIGNOR OF ONE-HALF TO OSCAR E. TENGDIN, JR., OF KANKAKEE, ILLINOIS.

SPUD-WRENCH.

1,369,143.   Specification of Letters Patent.   Patented Feb. 22, 1921.

Application filed July 12, 1920. Serial No. 395,495.

*To all whom it may concern:*

Be it known that I, CHARLES G. TENGDIN, a citizen of the United States, residing at Kankakee, county of Kankakee, State of Illinois, have invented an Improvement in Spud-Wrenches, of which the following description, in connection with the accompanying drawing, is a specification, like characters on the drawing representing like parts.

This invention relates to a spud wrench or a device for expansively gripping the interior of a cylindrical article.

The object of the invention is to provide a simple and powerful device by means of which spuds, thimbles, or other similar cylindrical articles may be readily handled and screwed into or out of threaded engagement with a threaded support.

The nature and object of the invention will more fully appear from the accompanying description and drawings and will be particularly pointed out in the claims.

In the drawings—

Figure 1:
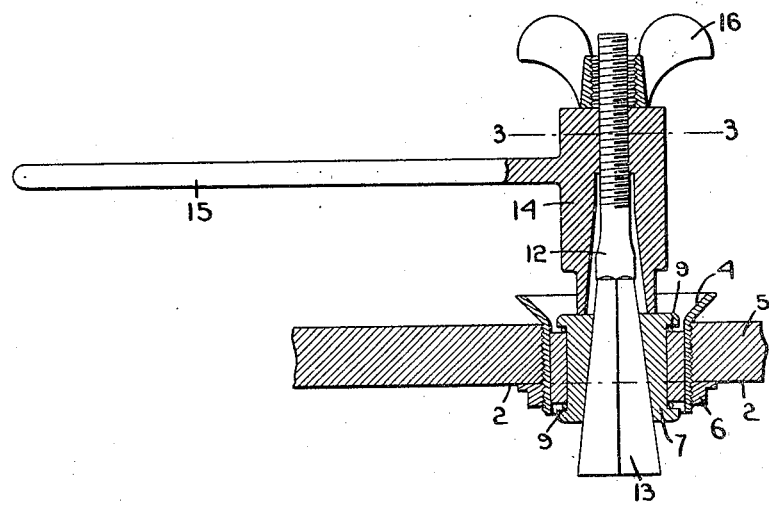
Figure 1 is a view chiefly in vertical cross section showing a preferred form of device embodying the invention in engagement with a spud or flush pipe thimble.
Figure 2:
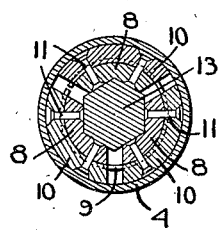
Fig. 2 is a view in transverse cross section taken on the line 2—2 of Fig. 1.
Figure 3:
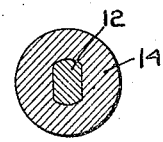
Fig. 3 is a view in transverse cross section taken on the line 3—3 of Fig. 1.

The device of this invention is designed to grip expansively the interior of a cylindrical article such as the flush pipe thimble or spud 4 shown threaded into a support 5 and carrying a lock nut 6.

The device comprises an expander head 7 formed of a plurality of radial sections. In the form illustrated there are three of these radial sections 8. These sections when assembled are so formed as to leave a tapered axial aperture extending longitudinally through the expander head.

The radial sections of the expander head are held yieldingly connected in such a manner as to permit radial movement by suitable yielding means. For this purpose resilient split wire rings 9 may be employed and two such rings are shown, one near each end of the expander head and surrounding it peripherally.

The exterior periphery of the expander head is also provided with a suitable frictional facing member and for this purpose a leather facing may be employed. This leather facing is in the form of separate sections 10, one for each of the sections of the head. This facing member is secured in position in any suitable manner as by the rivets 11 which are counter-sunk sufficiently at their outer ends so as not to come into contact with the spud or other cylindrical article to be clamped.

An expanding tapered pin 12 is provided and the tapered portion 13 of this pin conforms to and when in position is mounted in the aperture of the expander head. The tapered pin must also be keyed to the sections of the expander head so as to prevent relative rotation of the tapered pin and expander head. Such a keyed connection is preferably formed by making the tapered section 13 of the tapered pin pyramidal and by making the axial aperture of the expander head also pyramidal with an angle of the tapered section 13 engaging a corresponding angle in each radial section 8.

The wrench also includes a suitable handle. This handle is shown as comprising a socket head 14 and a radial arm 15. The socketed head 14 is keyed to the tapered pin and for this purpose the tapered pin may be slabbed off at opposite sides and the socketed head 14 apertured to fit the slabbed off tapered pin.

Means are also provided such as the wing nut 16 in threaded engagement with the tapered pin 12 by which when the wing nut is screwed down and the socketed head 14 of the handle abuts the expander head 7 the tapered pin will be forced longitudinally of the expander head and handle and thus the expansion of the expander head effected.

The manner in which the device is to be used will now be apparent. With the expander head in contracted position and the parts otherwise assembled as shown in Fig. 1 the entire device is inserted in the spud 4 or other cylindrical article which it is desired to clamp. The wing nut 16 is then screwed down forcing the tapered pin longitudinally of the expander head and causing the expander head to expand until the frictional facing members 10 tightly grip the interior periphery of the spud 4. Then by turning the handle 15 the spud will be turned in its support. To release the wrench from the spud it is only necessary to unscrew the wing nut and tap the end of the tapered pin.

The device is an extremely powerful one and enables any cylindrical article such as a spud or flush pipe thimble to be readily handled and to be screwed into and out of position in its support.

Having thus described my invention what I claim as new and desire to secure by Letters Patent is—

1. A spud wrench comprising an expander head formed of a plurality of radial sections and having a tapered axial aperture, means yieldingly connecting said sections and acting to permit radial movement thereof, a peripheral frictional facing member secured to the periphery of each section, an expanding tapered pin conforming to and mounted in the aperture of the expander head, means for preventing relative rotation of the tapered pin and expander head, a handle keyed to the tapered pin and when in position abutting the expander head, and means on the tapered pin for forcing the tapered pin longitudinally of the expander head and handle and thus expanding the expander head.

2. A spud wrench comprising an expander head formed of a plurality of radial sections and having a tapered axial aperture, means yieldingly connecting said sections and acting to permit radial movement thereof, a peripheral frictional facing member secured to the periphery of each section, an expanding tapered pin conforming to and mounted in the aperture of the expander head and keyed to each of the sections thereof whereby relative rotation of the tapered pin and expander head is prevented, a handle keyed to the tapered pin and when in position abutting the expander head and means on the tapered pin for forcing the tapered pin longitudinally of the expander head and handle and thus expanding the expander head.

3. A spud wrench comprising an expander head formed of a plurality of radial sections and having a tapered axial aperture, a resilient split ring surrounding said sections and acting to permit radial movement thereof, a peripheral frictional facing member secured to the periphery of each section, an expanding tapered pin conforming to and mounted in the aperture of the expander head, means for preventing relative rotation of the tapered pin and expander head, a handle keyed to the tapered pin and when in position abutting the expander head, and means on the tapered pin for forcing the tapered pin longitudinally of the expander head and handle and thus expanding the expander head.

4. A spud wrench comprising an expander head formed of a plurality of radial sections and having a tapered axial aperture, means yieldingly connecting said sections and acting to permit radial movement thereof, a leather facing secured to the periphery of each section, an expanding tapered pin conforming to and mounted in the aperture of the expander head, means for preventing relative rotation of the tapered pin and expander head, a handle keyed to the tapered pin and when in position abutting the expander head, and means on the tapered pin for forcing the tapered pin longitudinally of the expander head and handle and thus expanding the expander head.

In testimony whereof I have signed my name to this specification.

CHARLES G. TENGDIN.